(12) United States Patent
Braasch

(10) Patent No.: US 8,991,124 B2
(45) Date of Patent: Mar. 31, 2015

(54) CONCRETE MATERIAL, CONSTRUCTION ELEMENT FOR A THERMAL INSULATION, AND BRICK-SHAPED THERMALLY INSULATING ELEMENT, EACH USING THE CONCRETE MATERIAL

(75) Inventor: Harald Braasch, Sinzheim (DE)

(73) Assignee: Schöck Bauteile GmbH, Baden-Baden (DE)

(*) Notice: Subject to any disclaimer, the term of this patent is extended or adjusted under 35 U.S.C. 154(b) by 632 days.

(21) Appl. No.: 12/577,311

(22) Filed: Oct. 12, 2009

(65) Prior Publication Data
US 2010/0095616 A1 Apr. 22, 2010

(30) Foreign Application Priority Data

Oct. 17, 2008 (EP) .................................. 08018227

(51) Int. Cl.
*E04C 1/00* (2006.01)
*E04B 1/00* (2006.01)
*C04B 26/10* (2006.01)
*C04B 28/02* (2006.01)
*C04B 111/10* (2006.01)
*C04B 111/28* (2006.01)

(52) U.S. Cl.
CPC ................ *E04B 1/0038* (2013.01); *C04B 26/10* (2013.01); *C04B 28/02* (2013.01); *C04B 2111/1056* (2013.01); *C04B 2111/28* (2013.01); *C04B 2201/50* (2013.01)
USPC ...................................... 52/309.17; 52/223.8

(58) Field of Classification Search
CPC .................................. C04B 14/062; E04C 1/41
USPC ............. 52/309.17, 223.8; 106/733, 644, 638
See application file for complete search history.

(56) References Cited

U.S. PATENT DOCUMENTS

| | | | | | |
|---|---|---|---|---|---|
| 2,279,262 | A | * | 4/1942 | Edwards ........................ | 106/643 |
| 3,357,851 | A | * | 12/1967 | Montgomery, III .......... | 427/234 |
| 3,437,602 | A | * | 4/1969 | Rosensweig et al. ......... | 252/478 |
| 3,645,916 | A | | 2/1972 | Hall | |
| 4,288,955 | A | * | 9/1981 | Hiatt et al. .................... | 52/309.1 |
| 4,337,755 | A | * | 7/1982 | Pitha ............................. | 126/633 |
| 4,641,470 | A | * | 2/1987 | Baumberger .............. | 52/309.17 |
| 5,443,918 | A | * | 8/1995 | Banthia et al. ................ | 428/603 |
| 5,584,926 | A | * | 12/1996 | Borgholm et al. ............ | 106/713 |
| 6,221,152 | B1 | * | 4/2001 | Dial et al. ..................... | 106/805 |

(Continued)

FOREIGN PATENT DOCUMENTS

EP 1225283 7/2002

OTHER PUBLICATIONS

Standard Sieves and Mesh Sizes. <http://delloyd.50megs.com/moreinfo/mesh.html>.*

(Continued)

*Primary Examiner* — Mark Wendell
(74) *Attorney, Agent, or Firm* — Volpe and Koenig, P.C.

(57) ABSTRACT

A concrete material, particularly for concrete compression elements transmitting compressive forces, to be used in a structural element as the thermal insulation in structural engineering, made of a high-strength concrete in the strength class C55 or higher, with the concrete being embodied as a thermally insulating, load-bearing material including titanium minerals as additives. Additionally, a structural element for thermal insulation and a brick-shaped thermally insulating element, each using said concrete material, are provided.

10 Claims, 2 Drawing Sheets

(56) References Cited

U.S. PATENT DOCUMENTS 6,309,455 B1 * 10/2001 Skaggs et al. ............... 106/205.6
6,540,501 B1 * 4/2003 Bott ............................. 425/385
7,267,873 B2 * 9/2007 Pilakoutas et al. ............ 428/379

OTHER PUBLICATIONS

K. Sakr and E. El-Hakim, "Effect of High Temperature or Fire on Heavy Weight Concrete Properties", Science Direct, Mar. 3, 205, pp. 590-596, http://www.sciencedirect.com/science.

European Standard, EN 206-1, "Concrete Part 1: Specification, performance, production and conformity", 2000, European Committee for Standardization, Brussels, Germany.
"Bekanntmachung des Thuringer Ministeriums fur Bau . . ." (Jun. 16, 2011).
VDZ Activity Report 2003-2009, "Concrete constituents and technology, concrete engineering", pp. 98-127.
Makarious, A.S. et al., "On the Utilization of Heavy Concrete for Radiation Shielding", Ann. Nucl. Energy vol. 23, No. 3, pp. 195-206, 1996.
Eissa, N.A., et al., "Mössbauer Study of Ilmenite-Limonite Concrete for Nuclear Reactor Shield", Hyperfine Interactions 29 (1986), pp. 1483-1486.

* cited by examiner

CONCRETE MATERIAL, CONSTRUCTION ELEMENT FOR A THERMAL INSULATION, AND BRICK-SHAPED THERMALLY INSULATING ELEMENT, EACH USING THE CONCRETE MATERIAL

CROSS-REFERENCE TO RELATED APPLICATIONS

This application claims the benefit of European Application No. EP 08018227, filed Oct. 18, 2008, which is incorporated herein by reference as if fully set forth.

BACKGROUND

The invention relates to a concrete material, comprising a particularly high-strength concrete of the strength class C55 (55 N/mm$^2$) or higher (Concrete Standard DIN EN206-1). Further, it relates to a construction element for thermal insulation in structural engineering having compression elements comprising a concrete material and additionally a brick-shaped thermally insulating element for the use in the area of the wall bottom between a ceiling plate or a floor plate and a rising building wall having a load-bearing structure comprising the concrete material.

From EP-A 1 225 283 a construction element is known for the thermal insulation between two structural parts, in addition to an insulating body also comprising compression elements, that transfer pressures, connected to both structural parts, and are made from high-strength concrete. Recently, high-strength concrete has increasingly been used in this statically and thermally very important area and has begun to replace the previously common stainless steel—compression elements, with the rising prices for steel also contributing to this trend.

The high-strength concrete used here usually comprises approximately one third cement, one third siliceous sand, one sixth basalt, and micro-silicon in an amount of approximately 5%, water in an amount of approximately 10%, and a portion of flux material amounting to approximately 1.5%, with the percentages being referenced to the weight of the concrete. Thermic tests have now shown that in the area between the two structural parts mentioned, the compression element made from concrete still represents a weak link with regard to thermal insulation.

SUMMARY

Thus, using this knowledge, the present invention is based on the object of providing a concrete material of the type mentioned at the outset which has better features of thermal insulation without considerably compromising its load-bearing characteristics.

This object is attained according to the invention in the concrete that is embodied as a thermally insulating, load-bearing construction material comprising titanium minerals as additives. Titanium minerals, comprising ilmenite or titeriferous iron ore, in particular ilmenite, is characterized in that it has a density that is approximately 100% greater in reference to common additives and particularly in reference to siliceous sand; for this reason they had already been used in the past, i.e. in the 1970s, as an additive for radiation protection, for example, in structural concrete parts of nuclear power plants, however, subsequently they are no longer used. For this reason, ilmenite has been mined in only comparatively small amounts for decades, predominantly for producing paints, because titeriferous iron ore has an extremely high "whitening power" and represents the most important white pigment in paints, and additionally it is licensed as the food additive E171 for its lack of toxicity.

Surprisingly it has now shown that the titanium minerals and particularly ilmenite are able not only to considerably increase the strength but particularly also the thermally insulating features of the high-strength concrete, in an exemplary case by 50%. When the portion of usual additives, such as particularly siliceous sand, is reduced in the concrete to an amount of less than 10%, and particularly to a portion nearing or equivalent to zero, titanium minerals and particularly ilmenite can be used as alternative additives, which particularly results in improved features of thermal insulation and even in higher strength, without causing any otherwise disadvantageous effects.

Therefore, an advantageous concrete composition comprises, for example, titanium minerals that are included at a portion of approximately one third by volume and/or a portion of approximately 50% or more by weight, the concrete is produced without any siliceous sand, and that the titanium minerals show a grain size of no more than 0.5 mm, as known for other additives with regard to types of high-strength concrete, however uncommon for the mining of titanium minerals (normally the maximum commercial grain size amounts to approximately 5 mm.)

The present invention can be used not only in conventional cement-bonded concrete but also in concrete not requiring any cement and/or comprising additional bonding agents as well.

For example, in the so-called polymer concrete, explicitly included within the scope of the present invention, reaction resins (e.g., polyester, vinyl ester, polyurethane, epoxies or MMA-resins) are used as bonding agents in order to bond the aggregates. Here, cement is only used as an additional filler (to expand the aggregates) and has no primary bonding function. It is decisive that the reaction resins have the same functions as the cement paste of conventional concrete.

All components of conventional concrete mixtures can serve as fillers for polymer concrete (e.g., siliceous sand, basalt powder, micro-silica, cement, flue dust.) Here, too, due to the use of ilmenite combined with micro-silica and cement, an optimization of the thermal conductivity is achieved with a simultaneous increase in strength by up to 180 N/mm$^2$. Here, the share of the reaction resin ranges from approximately 18 to 35% by Vol. The remaining portion of fillers ranges from approximately 65 to 82% by Vol. Here, the maximum ranges of grain diameters amount to a size ranging from 0.1 to 0.5 mm. This way, in addition to its function as a force transmitting element the concrete can also contribute to optimize thermal conductivity, e.g., at cantilever platform connectors, without compromising strength. Another advantage of the polymer concrete, comprising the above-mentioned source materials for polymer concrete and ilmenite, is its increased bending strength by up to 40 N/mm$^2$, for example. The bending strength is a measure for the stability of the material. This way, the value is considerably higher than the values for conventional concretes and high-performance concretes containing cement paste.

When using ceramic hollow spheres (so-called e-spheres) and micro-glass hollow spheres of a particle size not exceeding 0.3 mm, for example, the concrete products can be further optimized, for example the compression elements. Here some of the ilmenite is replaced by hollow ceramic spheres.

Thus, by producing polymer concrete with fillers of an exemplary grain size not exceeding 0.5 mm and a resin portion ranging from 18 to 35% by Vol (10-50%), high compression strength and high tensile strength in bending can be achieved with simultaneously low thermal conductivity, which leads to optimize the function of the concrete product, thus e.g., the compression elements.

When fibers, particularly steel fibers, are added to the concrete the required and desired ductility is ensured without which the above-mentioned concrete could not be optimally used in the above-mentioned field of application.

Considering the new concrete composition and its particular advantages with regard to thermic and load capacity, the most varied purposes are suggested for using the concrete material according to the invention.

The use as a concrete compression element for the construction elements used to thermally insulate two structural parts has already been indicated above. Additionally, the present invention shall explicitly apply to a construction element for thermal insulation, including concrete compression elements, as generally described in EP-A 1 225 283, with its contents being incorporated herein by reference as if fully set forth, however, used with an essential further development such that instead of a "standard" high-strength concrete the thermally insulating—load-bearing concrete according to the invention is used, comprising titanium minerals as additives, with the titanium minerals comprising ilmenite or titiferous iron ore, particularly ilmenite. Due to the fact that in such a structural element for thermal insulation the compression element, via which the compressive forces are transferred to the adjacent structural parts, comprises the concrete material according to the invention the thermally insulating features can be considerably improved according to the invention in reference to structural elements for thermal insulation of prior art, with their compression elements comprising conventional high-strength concrete or stainless steel, without suffering any disadvantages concerning their load bearing behavior. The advantageous further developments of the concrete material according to the invention disclosed below and can also be used for the thermal insulation of advantageous embodiments of the structural element.

Furthermore, the novel concrete material can also be used as a load-bearing element for a brick-shaped thermally insulating element in order to thermally insulate wall parts and floor or ceiling parts, as known from EP-A 1 231 329, which is also incorporated herein by reference as if fully set forth. Using these brick-shaped thermal insulation elements, the construction occurs by force-transmitting load-bearing elements, on the one side, and insulating elements, on the other side, with the load-bearing elements of prior art, comprising lightweight concrete, lightweight mortar, or plastic. If now instead thereof the novel highly thermally insulating concrete material is used the load-bearing features of the load-bearing element made therefrom can be improved according to the invention and thus its sizing can also be adjusted to the improved strength values. This way, for example, the percentage of insulating material can be increased and thus the thermally insulating features can be further improved. Such a use of the concrete material and the brick-shaped thermally insulating element made therefrom shall be explicitly included in the scope of the present invention, with the features disclosed below and in the claims representing advantageous further developments of the brick-shaped thermally insulating element.

Additionally, it is also possible to use the novel concrete material wherever thermal insulation is particularly important, for example at the joint areas of ceiling and floor plates to their supports, as used for example in a building supported on posts. Here, the otherwise used site concrete can be replaced by the novel concrete material, considerably increasing and/or improving the thermal insulation in this area.

BRIEF DESCRIPTION OF THE DRAWINGS

Additional features and advantages of the present invention are discernible from the description and claims, which shall hereby be explicitly referenced to, and from the following description of two exemplary embodiments using the drawing. Shown are:

DETAILED DESCRIPTION OF THE PREFERRED EMBODIMENTS

Figure 1:
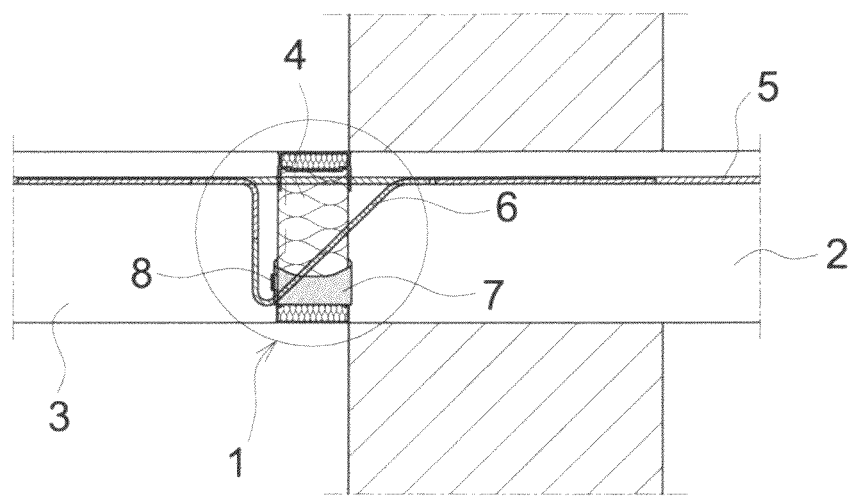
FIG. 1 is a view of a structural element for thermal insulation comprising a concrete compression element made from a concrete material according to the invention.

FIG. 1 shows a structural element 1 for thermal insulation, arranged between a load-bearing structural part 2 in the form of a building ceiling plate and a supported structural part 3 in the form of a balcony plate. For this purpose, the structural element 1 for thermal insulation comprises an insulating body 4 as well as reinforcing elements serving to transfer the forces and momentums between the two structural parts and in the present case comprising tensile steel bars 5 extending in the horizontal direction as well as lateral reinforcing steel bars 6 extending inclined through the insulating body 4 and concrete compression elements 7 connected to the two structural parts 2, 3.

The concrete compression elements 7 end approximately flush with the insulating body 4 and/or the overall structural element 1 and thus project only slightly into the concrete components 2, 3, where they abut with their end faces in a planar fashion. They are covered with a gliding layer made from plastic, at least at the faces pointing towards these components, with in the present example the gliding layer made from plastic comprises a casting form 8, encasing the concrete compression element at least laterally, into which the concrete compression element 7 is filled during its production and the concrete compression element is then installed together therewith in the structural element 1.

Due to the fact that the structural element 1 must fulfill not only static and/or dynamic requirements but primarily thermic ones the thermally insulating feature is focused upon. Here, the concrete compression elements 7 represent an important section, due to their relatively large area, which is further optimized by the present invention: For this purpose a high-strength concrete is used in a manner according to the invention comprising ilmenite as an additive and entirely omitting the otherwise common siliceous sand. This way, due to the higher density of ilmenite in reference to siliceous sand, not only the strength of the concrete compression element 7 is improved but primarily the thermal conductivity is considerably reduced in a particularly advantageous fashion, which particularly contributes to an improved thermal insulation of the structural element 1 embodied in this manner. Another particular advantage is caused in the fact that the concrete material according to the invention can easily be used to replace otherwise common high-strength concretes without this resulting in any disadvantages.

Figure 2:
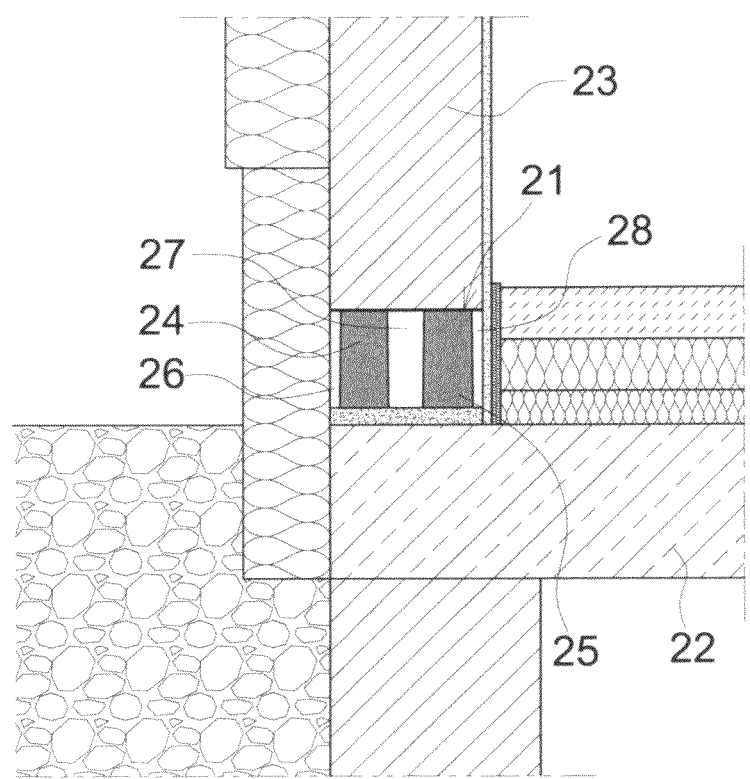
FIG. 2 is a view of a brick-shaped thermally insulating element having a load-bearing element comprising the concrete material according to the invention.

FIG. 2 shows a brick-shaped thermally insulating element 21, which is supported on a concrete floor plate 22, which in turn carries a building wall 23. This way, the brick-shaped thermally insulating element 21 forms an insulating section in the so-called wall bottom in order to keep coldness, potentially rising from the concrete floor plate 22, away from the building wall 23. In the exemplary embodiment shown, the thermally insulating element 21 comprises two bar-shaped load-bearing elements 24, 25, here, and an insulating element surrounding said load-bearing elements with the sections 26, 27, 28.

According to the invention, now each of the two load-bearing elements 24, 25 is made from the novel concrete material embodied as a thermally insulating load-bearing material, in which the otherwise common siliceous sand is entirely replaced by ilmenite. It is understood that the load-bearing elements may show different shapes; here it is essential that they represent a load-bearing framework with a reduced area and/or volume and/or skeleton, and that the remaining area of the brick formed this way can be filled with an insulating material.

As mentioned above, the novel concrete material can be used in most different fields of concrete construction where thermal insulation is to be improved. Due to the fact that such a concrete is slightly more expensive than conventional site concrete, of course, here the novel high-strength concrete can be limited to those areas that are to be thermally optimized and for this purpose either the high-strength concrete is prefabricated, as in the component mentioned for thermal insulation, and thus can be further processed as a prefabricated element, or by using a mold on site when casting high-strength concrete, which is then removed after the high-strength concrete has hardened, and subsequently the more cost-effective site concrete can be cast abutting this high-strength concrete.

The invention claimed is:

1. A structural element for thermally insulating two concrete components (2, 3), the structural element (1) comprising an insulating body (4) and reinforcing elements (5, 6, 7) adapted to be connected to the two concrete components to transmit at least one of forces or momentums between the two components, with one of the reinforcing elements comprising a compression element (7) for transmitting horizontal compressive forces and that is adapted to be connected to the two concrete components, the compression element (7) comprises a high-strength concrete having a strength of 55 N/mm$^2$ or higher, the concrete is embodied as a thermally insulating, load-bearing material and includes micro-silica sand as a filler, and ilmenite as an additive, and the high-strength concrete comprises a percentage of siliceous sand amounting to less than 10% by weight.

2. The structural element according to claim 1, wherein the ilmenite is present in a percentage of at least one of approximately one-third of the concrete by volume or a weight portion amounting to approximately 50% or more.

3. The structural element according to claim 1, wherein the high-strength concrete comprises a percentage of siliceous sand amounting to about 0% by weight.

4. The structural element according to claim 1, wherein the ilmenite acting as the additive for the high-strength concrete has a grain size of no more than 0.5 mm.

5. The structural element according to claim 1, wherein fibers are mixed into the concrete.

6. The structural element according to claim 5, wherein the fibers are steel fibers.

7. The structural element according to claim 1, wherein the concrete includes at least cement as a binder.

8. The structural element according to claim 1, wherein the concrete includes at least a reaction resin as a binder.

9. The structural element according to claim 1, wherein the concrete material is configured as a thermally insulating load-bearing material in concrete construction adapted for use in a connection area of buildings to posts supporting them.

10. The concrete material according to claim 1, wherein the concrete strength is 180 N/mm$^2$ or higher.

* * * * *